Oct. 16, 1928.
A. SCHOLER
1,688,024
TOY VEHICLE
Filed Feb. 21, 1927
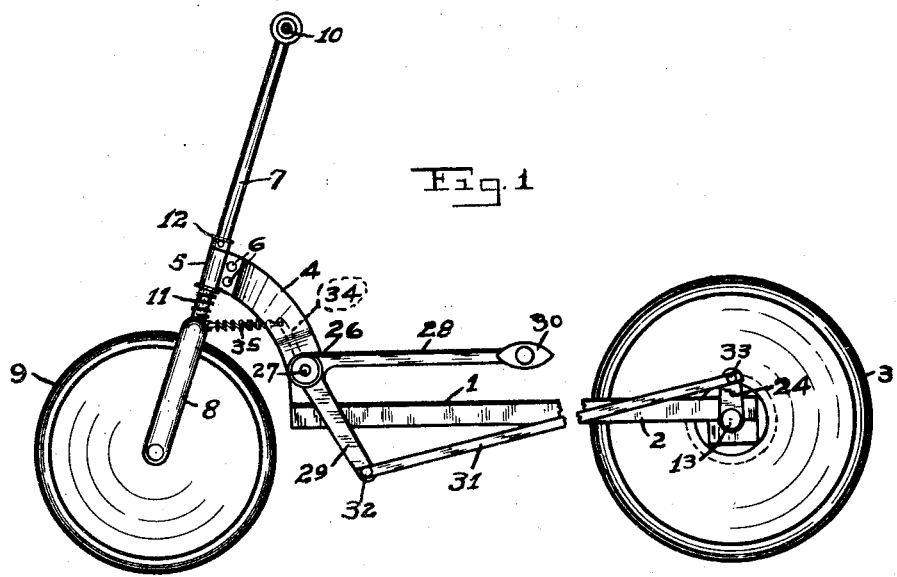
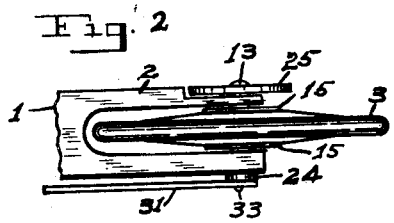
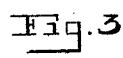
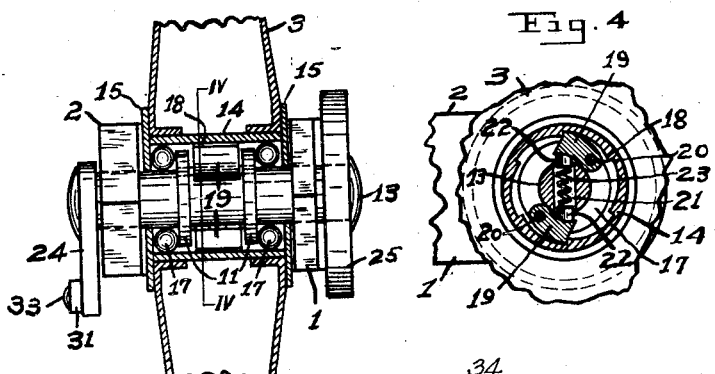
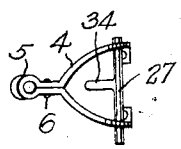
INVENTOR
August Scholer
By Jack Snyder
Attorney Patented Oct. 16, 1928.

1,688,024

UNITED STATES PATENT OFFICE.

AUGUST SCHOLER, OF PITTSBURGH, PENNSYLVANIA.

TOY VEHICLE.

Application filed February 21, 1927. Serial No. 169,771.

My invention relates to a toy vehicle, of the scooter type disclosed in my co-pending application for Letters Patent of the United States, bearing filing date the 10th day of January, 1925, and Serial No. 1,606.

Besides embodying all of the objects of the pending application above mentioned, the present invention has for its further object to provide a device of the character stated, which will permit of the suspension of the pedaling operation while the vehicle is coasting.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a side elevation of a toy vehicle in accordance with my invention.

Figure 2 is a top plan view of the rear end portion thereof.

Figure 3 is a rear view of the rear wheel and of associated parts, the rear wheel being in cross section and partially broken away.

Figure 4 is a sectional view on line IV—IV, Figure 3.

Figure 5 is a top plan view of the supporting bracket and the treadle shaft.

Referring in detail to the drawing 1 denotes a flat elongated body portion having a bifurcated rear end 2, in which a rubber tired rear wheel 3 is positioned.

A supporting bracket 4 is fixed on the top face of the body portion 1. The bracket 4 consists of a pair of spaced legs, the lower ends of which are secured, to respective side edge margins of the body portion 1, at the forward end thereof. The bracket 4 is disposed upwardly, forward and the forward end thereof is formed to provide an angularly disposed sleeve 5 by the convergence of the upper portion of the bracket legs and their connection by the pins 6.

The steering stem 7 extends through the bracket sleeve 5 and is rotatable therein. The steering stem 7 has a forked lower end 8, in which the front or steering rubber tired wheel 9 is rotatably mounted. The upper end of the steering stem 7 carries the steering cross-bar 10.

A spiral spring 11 is mounted on the steering stem 7, intermediate of the upper end of the fork 8 and the lower end of the bracket sleeve 5. The latter is vertically shiftable on the steering stem 7 and its engagement with the spring 11 provides a resilient mounting for the forward end of the vehicle. The upward shiftable movement of the bracket sleeve 5, on the stem 7, is limited by a collar 12 mounted on the stem 7.

The rear wheel 3 is mounted on the shaft 13. The latter is suitably journalled for rotation in the bifurcated rear end 2, of the body portion 1. The rear wheel 3 is provided with a fixed hub 14 and with a pair of fixed apertured side plates 15 disposed at respective ends of the hub 14. The shaft 13 extends through the apertured side plates 15 and is provided with a pair of spaced fixed collars 16 disposed in the hub 14. The rear wheel 3 has a ball bearing connection with the shaft 13 by means of the balls 17, which latter engage the respective ends of the hub 14 and are mounted in respective ball races formed by the collars 16 and the adjacent side plates 15, as clearly shown in Figure 3, of the drawing.

The hub 14 is formed on its inner face with ratchet teeth 18. The latter are disposed centrally of the hub 14 and extend circumferentially therein. A pair of pawls 19, associated with the ratchet 18 and disposed between the collars 16, are pivotally connected on pins 20. The latter have their end fixed in respective collars 16.

The rear shaft 13 is provided with a transversely extending aperture 21. Each of the pawls 19 is formed with a boss 22, which engage in respective ends of the aperture 21. A spiral spring 23 is mounted in the aperture 21 and acts against the pawl bosses 22 to normally maintain the pawls 19 in engagement with the ratchet teeth 18. The pawls 19 are diametrically disposed relatively to each other and extend in the same direction.

A crank arm 24 is fixed on one end of the shaft 13 and a balance or fly wheel 25 is fixed to the other end thereof. A substantially L-shaped treadle member 26 is forwardly mounted to one end of the treadle shaft 27, which latter is suitably journaled for rotation in the supporting bracket 4. The treadle member 26 consists of a rearwardly extending arm 28 and a depending arm 29. A pedal 30 is pivotally connected to the rear end of the arm 28, and a connecting bar 31 connects the lower end of the depending arm 29 with the outer end of the crank arm 24, is respectively indicated at 32 and 33.

A vertically disposed arm 34 is fixed to the treadle shaft 27 intermediate of the legs of the supporting bracket 4, and a spiral spring 35 connects the upper end of the arm 34 with the upper end of the steering stem fork 8. The action of the spring 35 normally tends to maintain the alignment of the wheels 3 and 9 relatively to each other, and in conjunction with the fly wheel 25, further aids in the propulsion of the vehicle.

The engagement of the pawls 19 with the ratchet teeth 18 is such that the operation of the treadle member 26 will propel the vehicle by the rotation of the shaft 13 in its rotatable connection in the bifurcated rear end 2, of the body portion 1. When coasting, the operation of the treadle member 26 is suspended, thereby locking the shaft 13 against rotation and allowing the rear wheel 3 to rotate on its ball bearing connection with the shaft 13. During the coasting operation the action of the spring 23 will allow the contraction of the pawls 19 to permit the idle passage of the ratchet teeth 18 over the latter.

What I claim is:

1. In combination, a toy vehicle, comprising a flat elongated body portion having a bifurcated rear end, a shaft rotatably journaled in said rear end, a rear wheel rotatably mounted on said shaft, a crank arm fixed to one end of said shaft, a fly wheel fixed to the other end of said shaft, a supporting bracket fixed to the forward end of said body portion, a treadle shaft rotatably journaled in said bracket, a steering stem, a wheel rotatably mounted in the lower end of said stem, said bracket having a resilient and rotatable connection with said stem, a treadle member fixed to said treadle shaft, a connecting bar pivotally connected with said member and with said crank arm, and a resilient member connecting said treadle shaft with said steering stem, said shaft having a ratchet engagement with said rear wheel, substantially as described and for the purpose set forth.

2. In combination, a vehicle toy comprising a flat elongated body portion having a bifurcated rear end, a rear shaft journaled for rotation in said bifurcated rear end, a rear wheel rotatably connected with said rear shaft, a fly wheel fixed to one end of said rear shaft and a crank arm fixed to the other end thereof, a supporting bracket consisting of a pair of spaced legs, the upper converging ends of said pair of legs formed to provide a sleeve and the lower ends of said legs fixedly secured to the forward end of said body portion, a steering stem extending through said sleeve to permit of its rotation and vertical movement therein, the lower end of said stem formed to provide a fork, a steering wheel rotatably mounted in said fork, a spiral spring carried on said stem intermediate of said fork and said sleeve, means carried by said stem for limiting the upward vertical movement of said sleeve on said stem, a treadle shaft journaled for rotation in said pair of bracket legs, a treadle member fixed to one end of said treadle shaft, a connecting bar connecting said treadle member and said crank arm, said rear shaft having a ratchet engagement with said rear wheel, the reciprocating movement of said treadle member imparting a rotary movement to said crank arm and associated rear wheel for propelling said vehicle in the forward direction, an upwardly disposed arm fixed to said treadle shaft intermediate of said bracket legs, and a resilient element connecting said last mentioned arm with said steering stem for normally maintaining the said steering wheel in alignment relatively to the said rear wheel and for aiding the reciprocation of said treadle member during the propelling operation, substantially as described and for the purpose set forth.

In testimony whereof I affix my signature.

AUGUST SCHOLER.